(12) United States Patent
David

(10) Patent No.: US 8,033,519 B2
(45) Date of Patent: Oct. 11, 2011

(54) PROJECTOR MOUNT WITH PHILLIPS SCREW DRIVER ANGLE ADJUSTMENT

(76) Inventor: Mike David, Corona, CA (US)

( * ) Notice: Subject to any disclaimer, the term of this patent is extended or adjusted under 35 U.S.C. 154(b) by 168 days.

(21) Appl. No.: 12/129,389

(22) Filed: May 29, 2008

(65) Prior Publication Data

US 2009/0294619 A1    Dec. 3, 2009

(51) Int. Cl.
*A47H 1/10*    (2006.01)
(52) U.S. Cl. ........ 248/324; 248/317; 248/323; 248/329; 248/674; 248/343; 248/342; 248/222.11; 248/519; 353/119
(58) Field of Classification Search ................... 248/324, 248/317, 323, 329, 674, 343, 342, 222.11; 353/119
See application file for complete search history.

(56) References Cited

U.S. PATENT DOCUMENTS

| | | | |
|---|---|---|---|
| 2,375,438 A | | 5/1945 | Regenhardt |
| 4,080,629 A | * | 3/1978 | Hammond et al. ........... 348/373 |
| 4,225,881 A | | 9/1980 | Tovi |
| 4,354,654 A | | 10/1982 | Werner et al. |
| 4,964,606 A | | 10/1990 | Beam et al. |
| 5,139,223 A | | 8/1992 | Sedighzadeh |
| 5,551,658 A | * | 9/1996 | Dittmer ........................ 248/329 |
| 5,833,189 A | | 11/1998 | Rossman et al. |
| 5,938,161 A | | 8/1999 | Tekeuchi et al. |
| 6,042,068 A | | 3/2000 | Tcherny |
| 6,341,927 B2 | | 1/2002 | Hampson et al. |
| 6,527,238 B2 | | 3/2003 | Shental et al. |
| 6,708,940 B2 | * | 3/2004 | Ligertwood ................... 248/324 |
| 6,883,920 B2 | * | 4/2005 | Chen ............................. 353/119 |
| 6,988,698 B2 | * | 1/2006 | O'Neill .......................... 248/323 |
| 7,156,359 B2 | * | 1/2007 | Dittmer et al. ................ 248/551 |
| D546,366 S | * | 7/2007 | Dittmer ........................ D16/235 |
| D552,454 S | | 10/2007 | Flynn |
| 7,455,273 B2 | * | 11/2008 | Lonnqvist ..................... 248/343 |
| 7,497,412 B2 | * | 3/2009 | Dittmer et al. ................ 248/514 |
| 7,503,536 B2 | * | 3/2009 | Friederich et al. ............ 248/324 |
| 2004/0211872 A1 | | 10/2004 | Dittmer et al. |
| 2005/0035253 A1 | | 2/2005 | Rixom |
| 2005/0139742 A1 | * | 6/2005 | Frisell ........................... 248/317 |
| 2007/0132655 A1 | | 6/2007 | Lin |
| 2007/0257181 A1 | | 11/2007 | Dittmer et al. |
| 2008/0061200 A1 | * | 3/2008 | Bouissiere ................. 248/206.5 |
| 2008/0308700 A1 | * | 12/2008 | Wei et al. ...................... 248/326 |

\* cited by examiner

*Primary Examiner* — Nkeisha J Smith
(74) *Attorney, Agent, or Firm* — Buhler & Associates; Kirk A. Buhler

(57) ABSTRACT

Improvements in a mount for attaching a television of projector to an overhead or ground structure is disclosed. The mount allows for spin, side to side and front to back angle adjustment. The adjustment components are formed from the present projector mount uses metal component having a rack comprising a plurality of formed teeth that are engageable in the recessed side of a crosshead screwdriver that is trademarked as a Phillips screwdriver. The recesses of the crosshead screwdriver act as a pinion gear in the rack to adjust the mounted angle of a projector on the projector mount. This configuration reduces parts count, size and cost without compromising functionality. The axis of rotation of both the side-to-side and front-to-back pass through the projector mount.

14 Claims, 5 Drawing Sheets

PROJECTOR MOUNT WITH PHILLIPS SCREW DRIVER ANGLE ADJUSTMENT

FIELD OF THE INVENTION

This invention relates to improvements in an adjustable projector mount. More particularly, the present projector mount uses metal component having a rack comprising a plurality of formed teeth that are engageable in the recessed side of a crosshead screwdriver that is trademarked as a Phillips screwdriver. The recesses of the crosshead screwdriver act as a pinion gear in the rack to adjust the mounted angle of a projector on the projector mount.

BACKGROUND OF THE INVENTION

Television and computer projectors are either placed on a table or are mounted to the ceiling. When these devices are mounted they must often be adjusted to project the image onto a screen or wall. The adjustment often requires changing the vertical and or rotational angle of the projector. Minor angular changes will have a great effect on where the image is being shown because the distance from the adjustment point to the pivot is amplified based upon the distance the image is being projected. Early projector mounts used frictional slides or jack screws where an installer would loosen or turn one or more threaded clamps and rotate or move the projector on the slides. Later versions of projector mounts used gears that a user turned to alter the angle. The use of gears improved the installers' ability to make minor changes, but the addition of the gears increased the mounting height and complexity of the projector mount. Exemplary examples of projector mounts using this technology are disclosed below herein.

U.S. Pat. No. 4,354,654 issued Oct. 19, 1982 to Franz Werner et al and U.S. Design Pat. No. D552,454 issued Oct. 8, 2007 to Shaun Fynn disclose frictional slides or swivels where the angle is adjusted by manually gripping the monitor or projector and physically rotating or turning the monitor or projector. While these patents disclose adjustable projector mounts, because of the backlash that is associated with frictional systems these mounts do not allow for finite positioning of the projected beam of a projector.

U.S. Pat. No. 6,042,068 issued Mar. 28, 2000 to Joseph Tcherny discloses a Low Profile LCD Projector Mount. The projector stand can be slid and locked into a base or lower element. This patent only provides front to back rotation of the mounting bracket. Adjustment is performed by loosening a screw clamp and manually rocking the LCD projector to achieve the desired angle. There are no provisions to alter the side to side orientation and because of mechanical backlash re-positioning of the projector would require several attempts.

U.S. Published Application 2007/0257181 published Nov. 8, 2008 to Jay Dittmer et al., discloses an Adjustable Projector Mount using integrated rack and integrated pinion gears to make adjustments to the angle of the LCD projector. The inclusion of the gears makes angular adjustment simpler with minimal backlash, but the integration of the gears, rack and pinion creates additional height and complexity to the projector mount.

What is needed is a projector mount where adjustment of the front to back and side to side is made with the head of a screw driver providing the function of the pinion gear. The proposed projector mount provides this function using integrated rack gears on the projector mount that are engageable and adjustable with a standard cross point screw driver.

BRIEF SUMMARY OF THE INVENTION

It is an object of the projector mount for the angular adjustment to be made with a rack formed in the side walls of the projector mount. These side walls already exist to provide structural and bearing surfaces on the vertical sides of the projector mount. A pivot pin is placed through the side walls to create a fulcrum that the rack is lifted against to alter the angle of the projector mount. The fulcrum exists on multiple sides of the projector mount to allow separate adjustment of the front-to-back angle and the side-to-side projecting angle.

It is an object of the projector mount for the front-to-back and side-to-side adjustment is with the use of a cross head screwdriver that is trademarked as a Phillips screwdriver. The head of a cross head screwdriver is placed into a hole corresponding to the approximate diameter of the shank diameter of the cross head screwdriver where the head forms a pinion gear that engages into rack gear in the projector mount to adjust the projection angle.

It is an object of the projector mount to provide spin adjustment to the projector mount to accommodate projection direction if the projector mount is not installed facing straight onto the projector screen or wall. Spin angle adjustments may be necessary when the ceiling mount is secured to a structural member that is not centered with the screen or wall or when installation in the center of the screen or wall is not possible.

It is another object projector mount is to construct the projector mount in a low profile to allow the projector mount to be mounted close to the ceiling. The need to mount the projector is close proximity to the ceiling allows for installations where there is limited room height. Inclusion of gears into the projector mount that aide in angular adjustment usually add additional height to the mounting apparatus that are not present in the pending design.

It is still another object of the projector mount to produce a projector mount is a more cost effective price. The elimination of parts, or the combination of parts, is the most effective means to reduce the cost of production. Cost reduction is often accomplished with the loss of functionality. In the pending application the rack is formed into existing structure and the pinion gear is provided using the cross head screw driver that an installer would normally use to install the projector mount. All of the desired features remain in the pending application with a lower cost of manufacturing.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
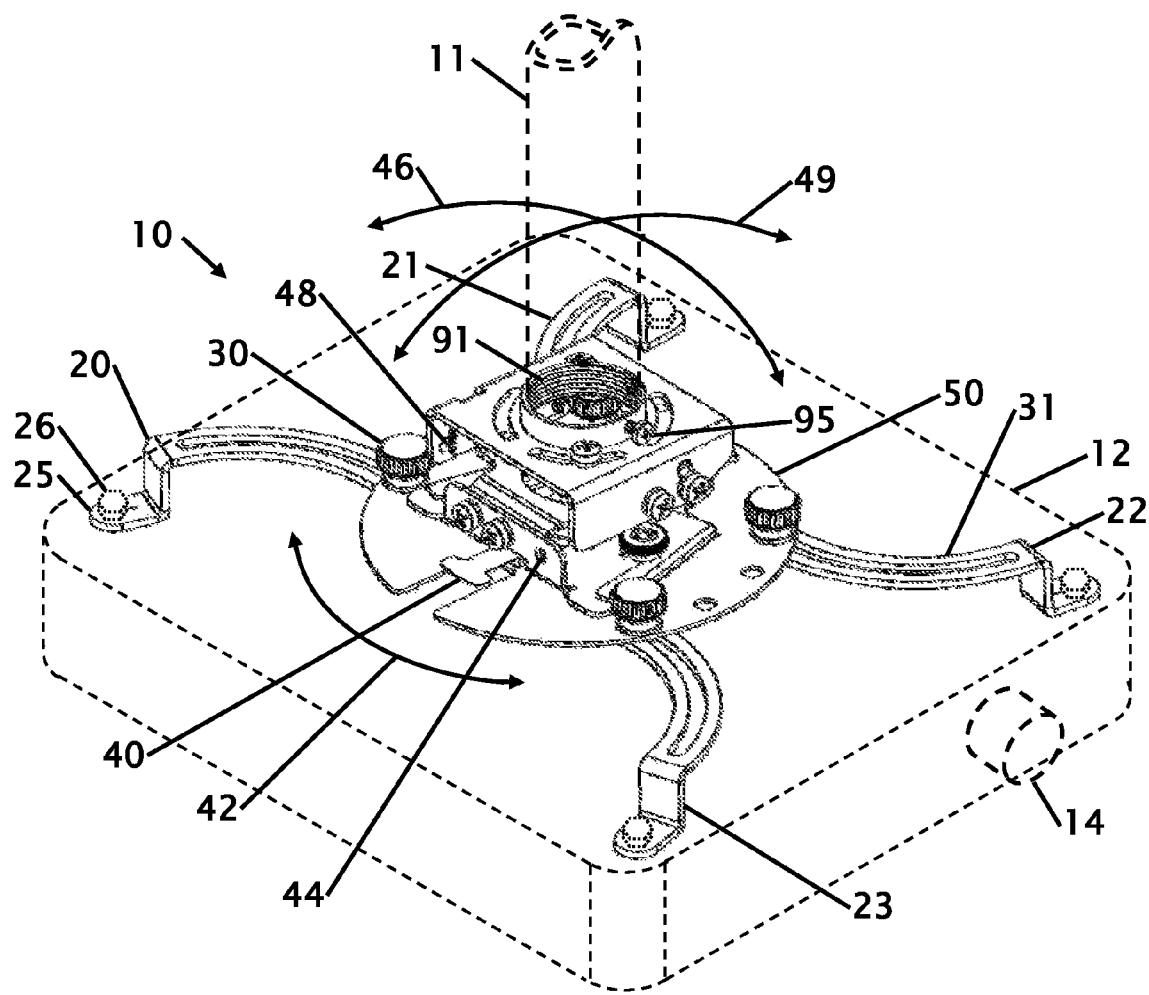
FIG. 1 shows an isometric view of the projector mount showing the mount on a ceiling extension tube and a LCD type projector.

FIG. 1 shows an isometric view of the projector mount showing the mount 10 on a ceiling extension tube and a LCD type projector 12 having a lens 14 that projects and image onto a screen or wall. This figure shows an LCD type projector mounted on a down tube 11, but the projector 12 could be mounted on a floor mounted post in an inverted orientation or on a side wall if desired. The down tube 11 is secured into a pipe thread and is locked from rotation with a set screw 95. The projector is secured or screwed into the projector with bolts 26, screws or the like. The securing mechanism is with a series of arms 20-23 that terminate on feet 25. The arms 20-23 are adjustably secured to the base 50 with slots 31 that are secured with a thumb screw 30 or similar securing means. The direction and angle of the projector 12 is adjustable. A yaw 42 adjustment is made by pushing a taw adjust tab 40 to one side or another. The yaw adjustment allows the projector to be side-to-side without moving the arms or the connection with the down pipe 11. The pitch 46 is adjustable by inserting a cross tipped screwdriver that is more commonly called a Phillips screwdriver into the pitch adjustment hole 44. The pitch adjustment raises and lowers the location of the projected image. Greater description of the pitch adjustment is found with FIGS. 2, 3, 6 and 7. The roll 49 is adjustable by inserting a cross tipped screwdriver into the roll adjustment hole 48. The role adjusts the side-to-side angle of projection. Greater description of the roll adjustment is found with FIGS. 2, 3, 6 and 7.

Figure 2:
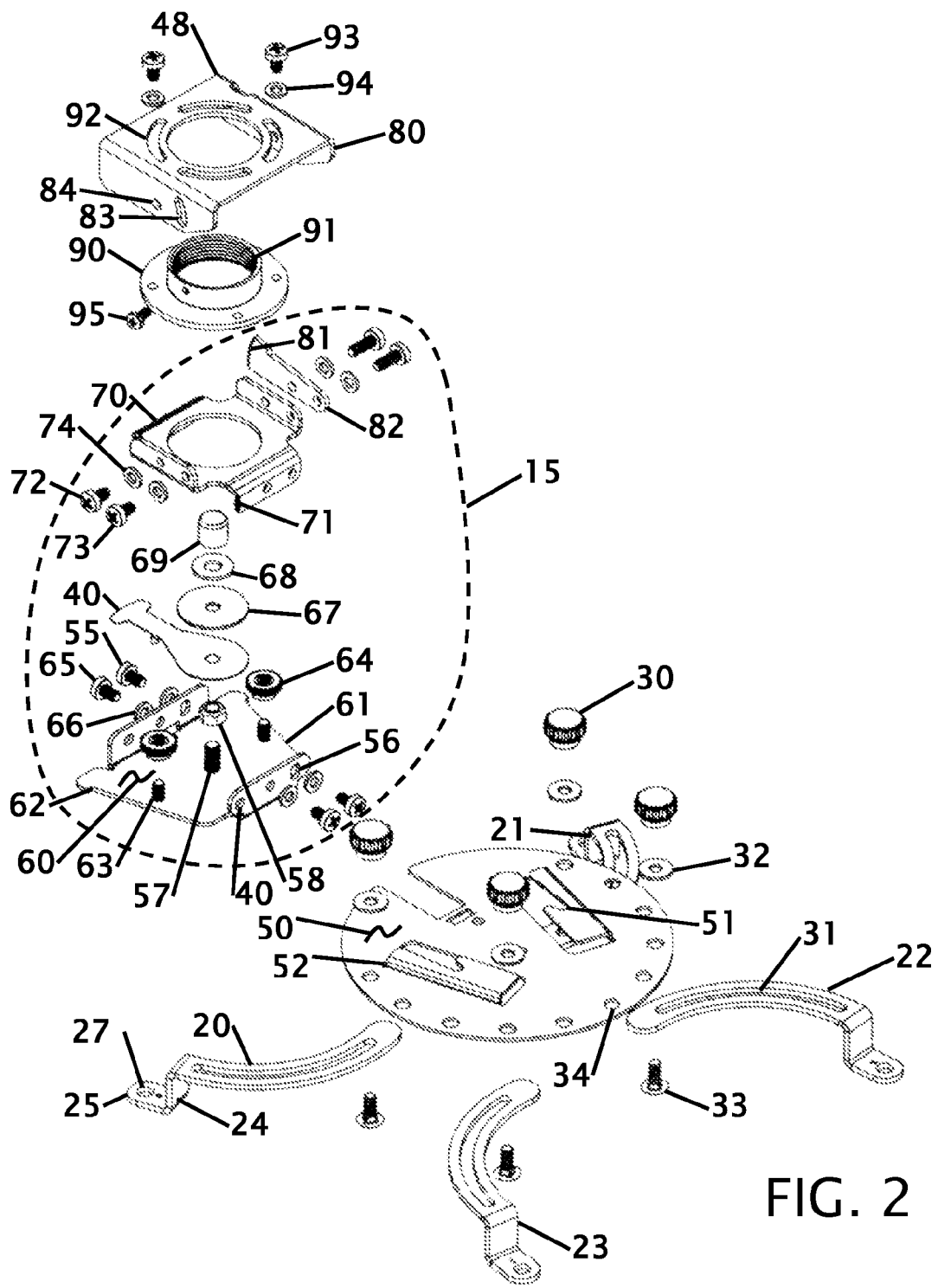
FIG. 2 shows an exploded diagram of the projector mount showing the various components.
Figure 3:
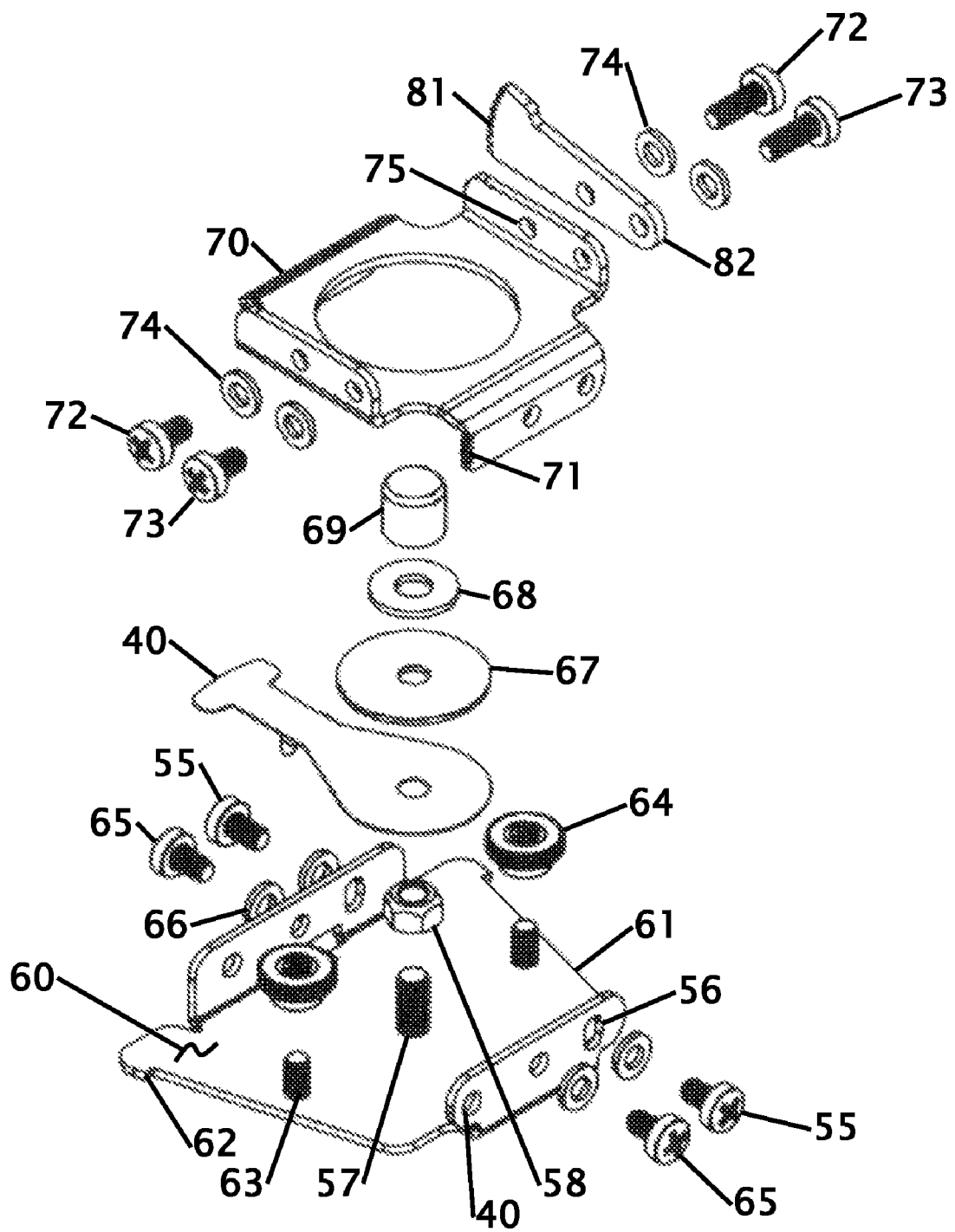
FIG. 3 shows an exploded view of the adjustment components from FIG. 2.

FIG. 2 shows an exploded diagram of the projector mount showing the various components. FIG. 3 shows a detailed exploded view of the adjustment components from FIG. 2. The dashed line 15 in FIG. 2 identifies the components that are shown in FIG. 3. Item numbers may not appear in both figures but the two figures should be viewed together to understand the relationship of the components. The arms 20-23 are curved in shape to allow them to wrap under and around the base 50 without intersecting each other. Each arm 20-23 has a vertical bend 24 that provides clearance to the underside of a projector for cooling and air movement. The vertical bend 24 has a horizontal foot 25 with a hole 27 for mounting to a projector. The curved portion of each arm has an elongated slot 31 that allows each arm to slide on the bottom of the base 50. The slot(s) 31 allows the projector mount to accommodate a variety of different size projectors with different mounting location holes. A series of holes 34 allows the arms 20-23 to be secured in a number of different locations on the base 50. A screw 33 bolt or other fastening means is placed through the arm 20-23, hole 34 washer 32 and into a thumb nut 30 that secures the position of each arm 20-23 onto the base 50. The base 50 has two wedge locking areas 52 that the lower plate 60 slides into to secure the lower plate 60 to the base 50 with a separable coupling.

The lower plate 60 has corresponding tapered sides 61 that guide and secure the lower plate 60 into the wedge locking areas 52. Two screw recesses 51 exist for locating and securing the lower plate 60 onto the base 50. Studs 63 on the lower plate 60 engage into the screw recesses 51 and thumb nuts 64 lock the lower plate 60 into the base 50. Stops 62 prevent over engagement of the lower plate 60 in the base 50.

The lower base 60 has a center yaw stud 57 where a yaw adjustment tab 40 is secured to allow for side to side movement of a mounted projector. Washers 67, 68 are placed over the top of the yaw adjustment tab 40. Bushing 69 is further placed on top of washer 68 where it is secured with nut 58. The front and back sides of the lower plate 60 are bent and have a slot 56 where screws 55 travel while screws 55 are secured into the middle plate 70. Screws 65 are used as pivot points as they pass through the lower plate 60 and into the middle plate 70. The tip of a cross headed screw driver is placed through pitch adjustment hole 44 where the tip engages into pitch rack 71 for adjustment of the pitch. A detailed view of the engagement and adjustment is shown and described in more detail with FIGS. 6 and 7. Screws 55 and 65 pass through washers 66. Screws 55 and 65 can be loosened to allow for pitch 46 adjustment and then tightened to lock the pitch 46 adjustment (shown in FIG. 1). The middle plate 70 is secured to the lower plate 60 through pivot screws 65.

Lever rack arm 82 is pivotally secured to the middle plate 70 with screw 72 acting as a fulcrum pivot point where it passes through washers 74, hole 84 and into threaded hole 75 allowing the projector mount to pivot through the projector mount. The screws can be slightly tightened to provide a frictional movement of the pivot. The rack arm 82 exists on only one side between the middle plate 70 and the upper plate 80. Slot 83 provides constrained movement of rack arm 82. Screw 73 acts as a guide for rack arm 82 where screw 73 passes through washer 74, slot 83 and is threaded into the middle plate 70. The tip of a cross headed screw driver is placed through roll adjustment hole 48 (not visible in this view) where the tip engages into roll rack 81 for adjustment of the roll. A detailed view of the engagement and adjustment is shown and described in more detail with FIGS. 6 and 7.

Screws 72 and 73 can be loosened to allow for roll 48 adjustments and then tightened to lock the roll 42 adjustment (shown in FIG. 1). These screws can be slightly tightened to provide some frictional movement of the roll 42. Tube coupler 90 is secured to the upper plate 80 using screws 93 that pass through washers 94 and then into tapped holes in the tube coupler 90. A series of arced slots 92 exist in the top plate to allow for limited rotation of the upper plate 80 on the tube coupler 90. A set screw 95 threads through the side of the tube coupler to prevent rotation of an installed tube on the tube coupler 90.

Figure 4:
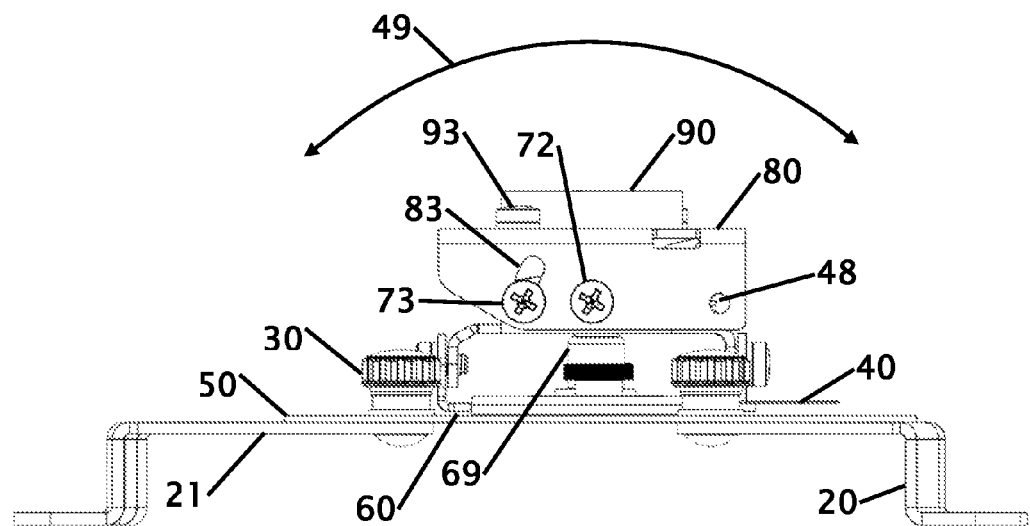
FIG. 4 shows a back view of the projector mount.
Figure 5:
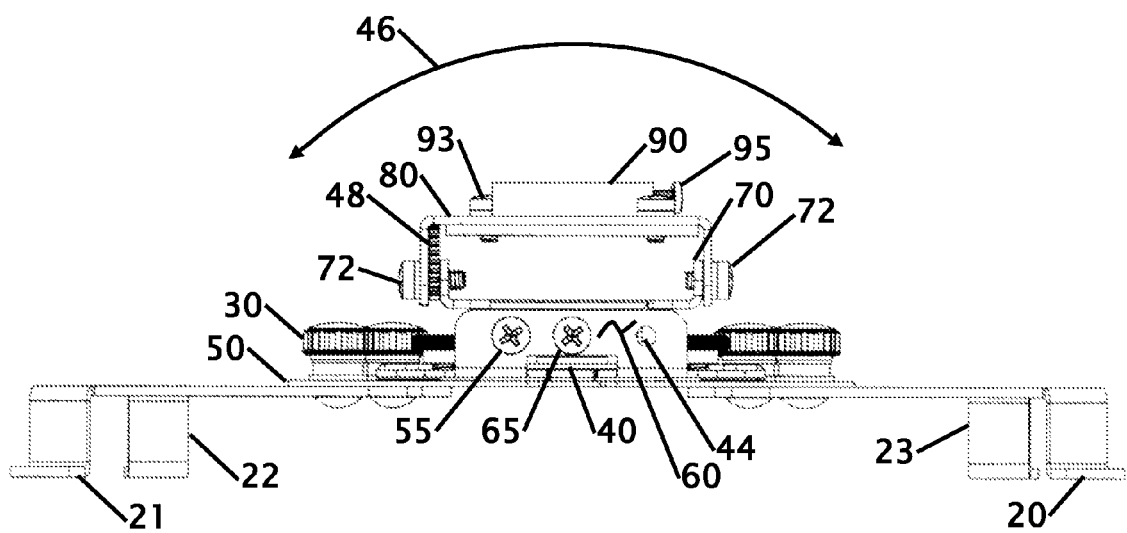
FIG. 5 shows a left view of the projector mount.

FIG. 4 shows a back view of the projector mount. FIG. 5 shows a left view of the projector mount. Two or more of the securing arms 20-23 are shown in these figures with some spacing that allows air flow between a mounted projector and the projector mount. The base 50 is shown secured to the securing arms 20-23 with thumb nuts 30. The yaw adjusting tab 40 is shown extending horizontally in FIG. 4 and extending from the projector mount in FIG. 5. The lower plate 60 is secured onto the base 50. The middle plate 70 connects the lower plate 60 to the upper plate 80. The tube coupler 90 extends out the top of the upper plate 80 where it is secured with screw(s) (93). Set screw 95 is visible in FIG. 5 to lock a down pipe (not shown) onto the tube coupler 90.

Adjustment of the roll 49 is best viewed in FIG. 4. To adjust the roll 49 screws 72 and 73 are loosened. A cross tipped screw driver is inserted into the roll adjust 48 hole where the flutes of the screw driver engage in the rack gear. Turning the screw driver will make the upper plate 90 pivot on screw 72. A more detailed image and description of the engagement of the cross tipped screwdriver in the rack is shown and described in more detail with FIGS. 6 and 7. Screw 73 will move in slot 83. When the desired roll 49 is achieved, screws 72 and 73 will be tightened to lock the roll orientation Adjustment of the pitch 46 is best viewed in FIG. 5. To adjust the pitch 46 screws 55 and 65 are loosened. A cross tipped screw driver is inserted into the roll adjust 44 hole where the flutes of the screw driver engage in the rack gear.

Turning the screw driver will make the middle plate 70 pivot on screw 65. A more detailed image and description of the engagement of the cross tipped screwdriver in the rack is shown and described in more detail with FIGS. 6 and 7. Screw 55 will move in a slot. When the desired pitch 46 is achieved, screws 55 and 65 will be tightened to lock the pitch orientation.

Figure 6:
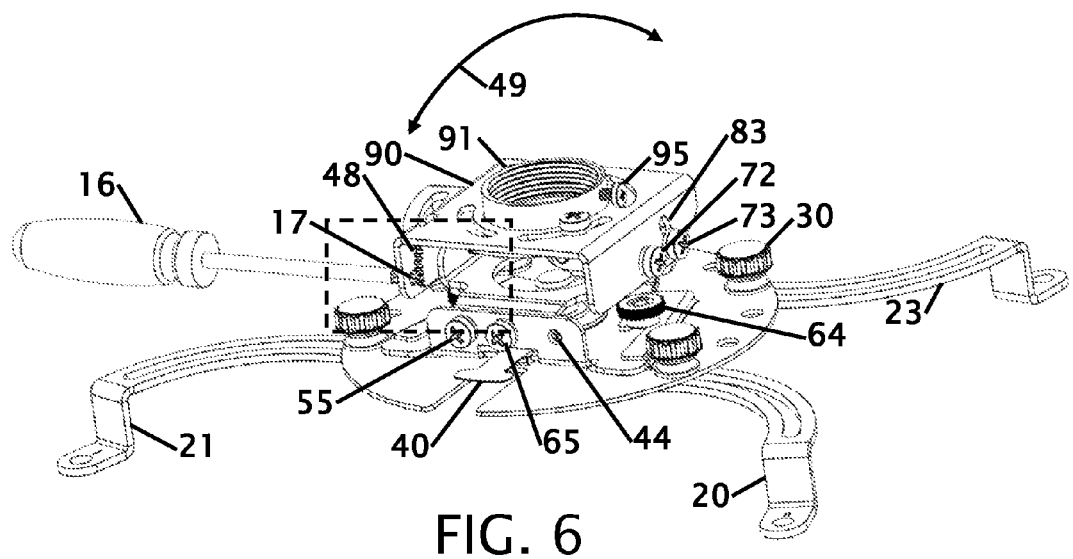
FIG. 6 shows a cross head screw driver engaged in the rack.
Figure 7:
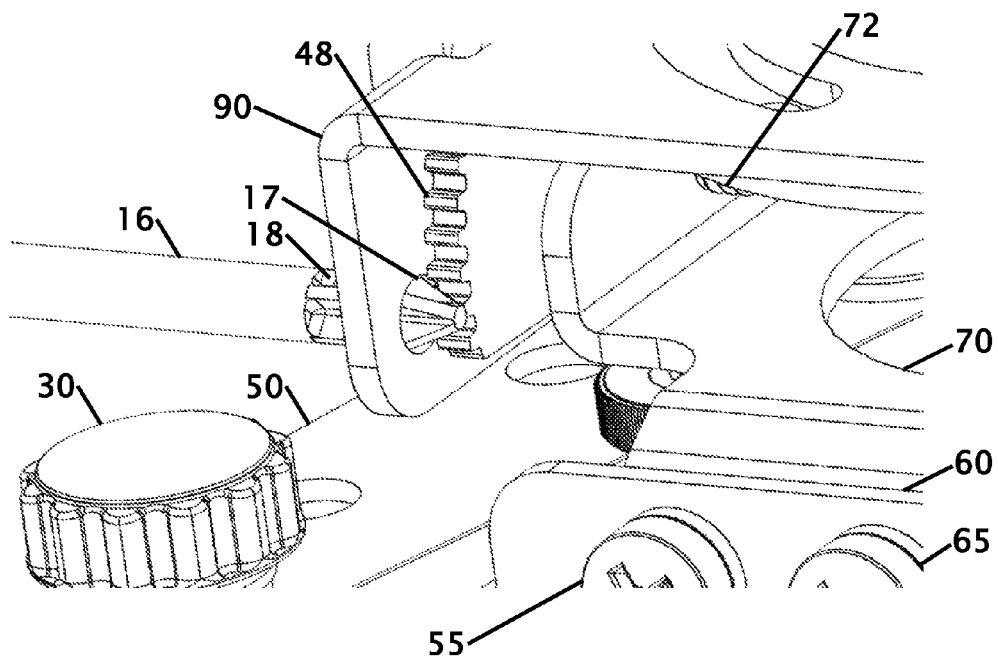
FIG. 7 shows a detailed view of the cross head screw driver engaged in the rack from FIG. 6.

FIG. 6 shows a cross head screw driver engaged in the rack. FIG. 7 shows a detailed view of the cross head screw driver engaged in the rack from FIG. 6. Securing arms 20, 21, 23 are shown in FIG. 6 on the bottom (or top depending upon installation orientation). The base 50 is shown secured to the securing arms 20-23 with thumb nuts 30. The yaw adjusting tab 40 is shown extending horizontally in FIG. 4 and extending from the projector mount in FIG. 5. The lower plate 60 is secured onto the base 50. The middle plate 70 connects the lower plate 60 to the upper plate 80. The tube coupler 90 extends out the top of the upper plate 80 where it is secured with screw(s) (93). Set screw 95 is visible in FIG. 6 to lock a down pipe (not shown) onto the threads 91 of tube coupler 90. Thumb nut(s) 64 secure the lower plate 60 to the base 50. The yaw adjusting tab 40 is shown extending from the lower plate 60 in FIG. 6.

FIGS. 6 and 7 only show and describe adjustment of the roll 49, but adjustment for the pitch is performed using similarly configured components and rack as a means of using a cross tipped screw driver for the function of a pinion gear on a rack to adjust the pitch. Components for adjusting the pitch include screws 55, 65 and pitch adjustment 44 and were shown and described with FIG. 5. The roll 49 adjustment is performed by loosening screws 72 and 73. The same cross tipped screw driver that is used to loosen screws 72 and 73 can be used as a pinion gear to adjust the roll. A cross tipped screw driver 16 is inserted into the roll adjust hole where the flutes 18 of the screw driver engage in the roll adjust 48 rack gear. A detailed view within the dashed box in FIG. 6 is shown zoomed in FIG. 7. In the zoomed view 7 the flutes 18 of the end of the shank of the cross tipped screwdriver 16 are shown engaged into the rack 48. The hole the screwdriver is placed into acts as a bearing to locate the screwdriver tip 17 allowing the tip 17 to be a means for the function of acting as a pinion gear on the rack 48. Turning the screw driver will make the upper plate 90 pivot on screw 72. Screw 73 will move in slot 83. When the desired roll 49 is achieved, screws 72 and 73 will be tightened to lock the roll orientation.

Thus, specific embodiments of a projector mount have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A projector mount comprising:
a first mounting side operably attachable to ceiling, floor or wall structure;
a second mounting side located on the opposing side of said first mounting side for operable attachment of a projector;
said projector mount providing a side-to-side angular adjustment of said first mounting side relative to said second mounting side in an axis extending through said projector mount;
said side-to-side angular adjustment is by means of a rack gear formed from the projector mount;
a hole that partially eclipses an adjacent said rack gear through which an interior diameter of said hole provides a bearing surface for the function of locating a cross tipped screwdriver whereby flutes of said cross tipped screwdriver is engageable into said rack gears and when said cross tipped screwdriver is turned in said rack gear(s) said side-to-side angle is adjusted by lifting one side of said projector mount wherein said side-to-side angle between said first mounting side and said second mounting side is altered;
a plurality of independently adjustable securing arms for securing said projector that provides mounting and air flow between said projector mount and a mounted projector and,
a yaw adjustment that is adjusted through said independently adjustable securing arms.

2. The projector mount according to claim 1 wherein said cross tipped screwdriver acts as a pinion gear with said rack gear.

3. The projector mount according to claim 1 that further includes a front-to-back angular adjustment by means of a rack gear formed from the projector mount for the function of using a cross tipped screwdriver that is engageable into said rack gears and when said cross tipped screwdriver is turned in said rack gear said front-to-back angular adjustment by lifting one side of said projector mount wherein an angular relationship is altered between said first mounting side and said second mounting side by an axis extending through said projector mount.

4. The projector mount according to claim 1 that further includes a separable coupling between said first mounting side and said second mounting side using a tapered wedge lock.

5. The projector mount according to claim 1 wherein said plurality of independently adjustable securing arms are curved to accommodate different mounting hole patterns on projectors and to reduce securing arm to securing arm interference.

6. The projector mount according to claim 1 wherein said side-to-side angular adjustment is by means of a single pivoting axis running through said projector mount.

7. The projector mount according to claim 3 wherein said front-to-back angular adjustment has an axis of angular adjustment rotation that extends through said projector mount.

8. A projector mount comprising:
a first mounting side operably attachable to a ceiling, floor or wall structure;
at second mounting side located on the opposing side of said first mounting side for operable attachment of a projector;
said projector mount providing a front-to-back angular adjustment of said first mounting side relative to said second mounting side in an axis extending through said projector mount;
said front-to-back angular adjustment is by means of a rack gear formed from the projector mount;
a hole that partially eclipses an adjacent said rack gear through which an interior diameter of said hole provides a bearing for the function of locating a cross tipped screwdriver whereby flutes of said cross tipped screwdriver is engageable into said rack gears and when said cross tipped screwdriver is turned in said rack gear(s) said front-to-back angle is adjusted by lifting one side of said projector mount wherein said front-to-back angle between said first mounting side and said second mounting side is altered;
a plurality of independently adjustable securing arms for securing said projector that provides mounting and air flow between said projector mount and a mounted projector and, a yaw adjustment that is adjusted through said independently adjustable securing arms.

9. The projector mount according to claim 8 wherein said cross tipped screwdriver acts as a pinion gear with said rack gear.

10. The projector mount according to claim 8 that further includes a side-to-side angular adjustment by means of a rack gear formed from the projector mount for the function of using a cross tipped screwdriver that is engageable into said rack gears and when said cross tipped screwdriver is turned in said rack gear said side-to-side angle by lifting one side of said projector mount wherein an angular relationship is altered between said first mounting side and said second mounting side by an axis extending through said projector mount.

11. The projector mount according to claim 8 that further includes a separable coupling between said first mounting side and said second mounting side using a tapered wedge lock.

12. The projector mount according to claim 8 wherein said plurality of independently adjustable securing arms are curved to accommodate different mounting hole patterns on projectors and to reduce securing arm to securing arm interference.

13. The projector mount according to claim 8 wherein said front-to-back angular adjustment is by means of a single pivoting axis running through said projector mount.

14. The projector mount according to claim 10 wherein said side-to-side angular adjustment has an axis of angular adjustment rotation that extends through said projector mount.

* * * * *